Dec. 2, 1941.   S. E. WARREN   2,264,650
GUANO DISTRIBUTOR
Filed March 17, 1938   2 Sheets-Sheet 1

Inventor
Silas Emmett Warren

By Clarence A. O'Brien
and Hyman Berman
Attorneys

Dec. 2, 1941.                S. E. WARREN                2,264,650
                           GUANO DISTRIBUTOR
                        Filed March 17, 1938          2 Sheets-Sheet 2
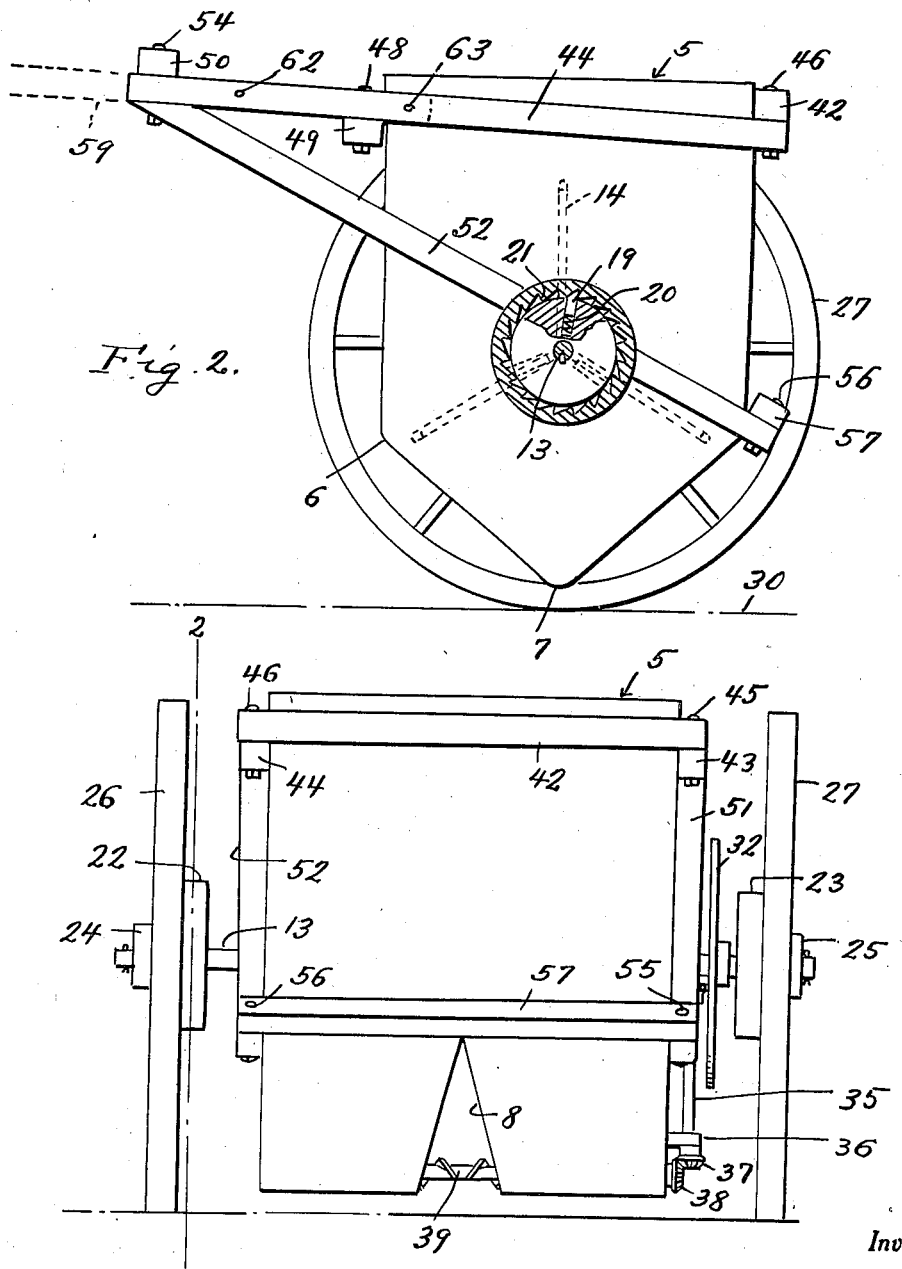
Inventor
Silas Emmett Warren
By Clarence A. O'Brien
and Hyman Berman
Attorneys Patented Dec. 2, 1941

2,264,650

UNITED STATES PATENT OFFICE 2,264,650

GUANO DISTRIBUTOR

Silas Emmett Warren, Enfield, N. C.

Application March 17, 1938, Serial No. 196,521

2 Claims. (Cl. 275—2)

My invention relates generally to improvements in distributors for guano and other soil conditioning materials, and an important object of the invention is to provide a distributor of this character which is of simplified construction, whereby the manufacturing cost is reduced, and more efficient action obtained.

Other important objects of my invention will be apparent from a reading of the following description taken in connection with the drawings, wherein for purposes of illustration I have shown a preferred embodiment of my invention.

In the drawings:

Figure 2 is a transverse vertical sectional view taken through Figure 3 approximately on the line 2—2 and looking toward the right.

Figure 3 is a rear end elevational view.

Figure 4:
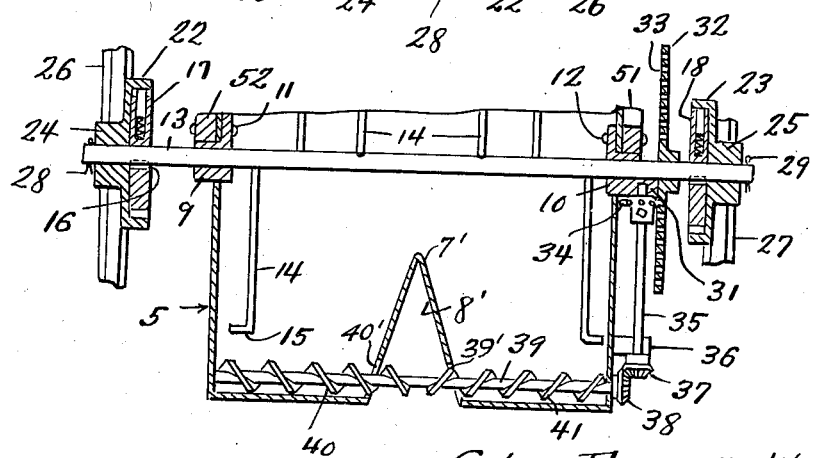
Figure 4 is a fragmentary transverse vertical sectional view taken through Figure 2.

Referring in detail to the drawings, the numeral 5 generally designates the guano containing hopper which may suitably be made of sheet metal and has a rectangular horizontal cross section, resulting in a generally rectangular form except for the triangular lower part extending below the point 6 and terminating at its depending apex 7 in triangular openings 8 and 8', respectively in the front and rear walls of this depending portion. An inverted V-shaped wall 7' extends between and is connected with the edges of the openings 8 and 8'. L-shaped bearings 9 and 10 have standard portions attached as indicated by the numerals 11 and 12 to the inner surfaces of the side walls of the hopper 5 as shown in Figure 4 of the drawings and these have the journal parts thereof extending through accommodating openings in the said side walls and formed with openings journalling the rotary agitator shaft 13 which extends through the hopper approximately centrally wtih respect to the front and rear walls of the hopper. The shaft 13 has circumferentially spaced fingers 14 provided with laterally directed ends 15 which are swung by rotation of the shaft 13 in the interior of the hopper to stir up the guano or other material in the hopper and aid in feeding the same toward the discharging openings 39' and 40' in the inverted V-shaped wall 7', through which the material falls in an orderly manner upon the ground as the distributor is drawn along the ground.

On the opposite ends of the shaft 13 and keyed thereto as indicated by the numeral 16 are the respective ratchet hubs 17 and 18, which, as shown in Figure 2, are disk-like bodies having a ratchet dog 19 slidably mounted in a radial bore therein and outpressed by a spring 20 to engage the internal ratchet teeth 21 on the corresponding ratchet casings 22, 23. Each such casing has a relatively large solid hub 24, 25, respectively, constituting the central members of the corresponding ground engaging wheels 26, 27 which are maintained on the axle by means of the cotter keys or the like 28, 29, respectively. The wheels support the depending apex 7 of the hopper at a small distance above the ground 30 as indicated in Figure 2 of the drawings for proper distribution of the guano.

Disposed between the wheel 27 and its related ratchet body 18 and an extended portion 31 of the journal portion of the bearing 10 is the operating wheel or disc 32 which is formed with circumferentially spaced openings 33 in which engage the lugs 34 on the upper end of a jack shaft 35 which has its upper end journaled in the extension 31 and its lower end journaled in a bracket 36 attached to the outside of the adjacent side of the hopper, below which the jack shaft is provided with a beveled pinion 37 which is in mesh with a beveled pinion 38 on the worm shaft 39 which is journaled in the opposite sides of the hopper and in a position in the bottom of the apex 7 to feed the material from this portion of the hopper to the openings 39' and 40'. A set screw or bolt 40 fastens the wheel 32 to the shaft 13 for rotation with this shaft, so that as the distributor is drawn over the ground and the axle 13 thereby turned, the worm or material feeding shaft 39 which has the oppositely operating worm portions 40 and 41 will feed the material from the sides of the hopper toward the openings 39' and 40' in a positive manner and at a speed coordinated with the progress of the distributor over the ground.

The draft frame of the distributor comprises the upper rear cross member 42 which engages the back wall of the hopper 5 at the upper end thereof as indicated in Figures 2 and 3, and the longitudinal side members 43 and 44 which are attached by the bolts 45 and 46 under the ends of the rear cross member 42 and incline forwardly and are bolted as indicated by the numerals 47 and 48 on top of the front cross member 49 which lies against the front of the upper part of the hopper. The front portions of the longitudinal side members 43 and 44 extend forwardly beyond the hopper and under a third cross member 50, and rearwardly declining longitudinal members 51 and 52 are cut off at an angle and joined to the front extremities of the longitudinal side members 43 and 44 by means of the bolts 53 and 54 which traverse the cross member 50, the longitudinal side members 43 and 44 and the declining longitudinal members 51 and 52, so as to join all together. The rear intermediate portions of the declining longitudinal members 51 and 52 rest on the top of the foot portions of the bearings 9 and 10 as clearly shown in Figure 4 of the drawings, and the fasteners 11 and 12 which secure the standard portions of these bearings to the side walls of the hopper, pass through the side walls and securably engage these members 51 and 52. The rear extremities of the members 51 and 52 are bolted as indicated by the numerals 55 and 56 under the opposite ends of a fourth cross member 57 which lies thereacross and engages the lower part of the back wall of the hopper.

For one-horse draft, the side members 58 and 59 are bolted as indicated by the pairs of bolts 60, 61 and 62, 63 to the outer sides of the longitudinal side members 43 and 44 at the forward part thereof, the bolts 61 and 63 traversing also the sides of the hopper 5.

Figure 1:
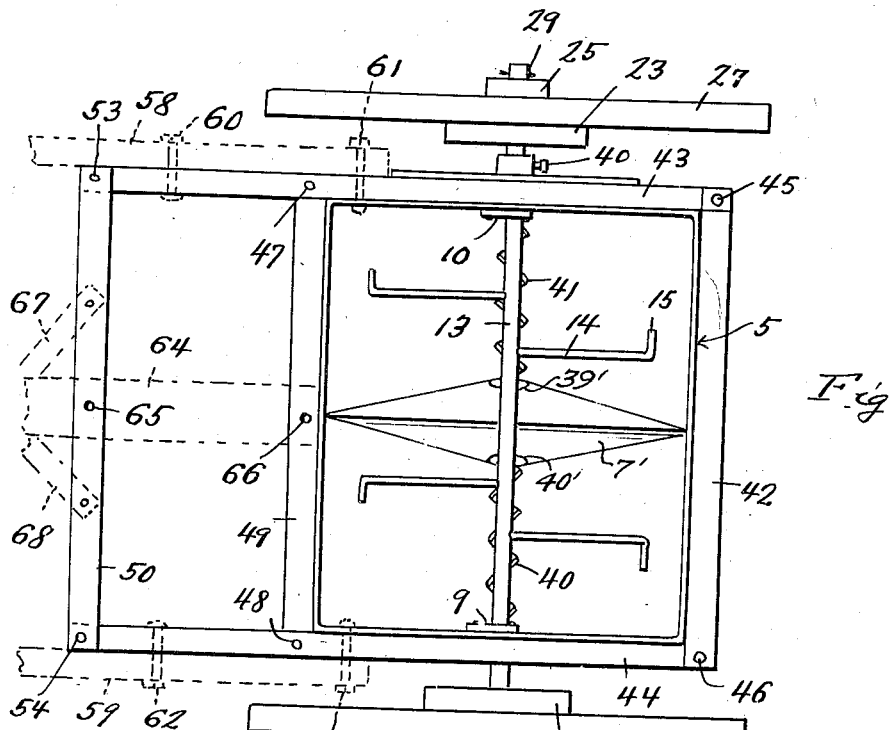
Figure 1 is a general top plan view of the embodiment showing in dotted lines the two horse and the one horse draft arrangements.

For two-horse draft, a single whiffletree arrangement 64 is employed which is fastened by means of bolts 65 and 66 to the cross members 50 and 49, respectively, as indicated in Figure 1 of the drawings, and if desired angulated braces 67 and 68 have their rear ends bolted to the cross member 50 and their front ends bolted to the whiffletree 64 to provide a desired rigid connection.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

Having described the invention, what is claimed as new is:

1. In a device of the character described, a hopper, a transverse rotary agitator shaft extending through openings formed in the opposite sidewalls of said hopper, shaft bearings each comprising a standard portion secured to the corresponding one of said sidewalls and a journal part extending axially outwardly through the corresponding one of said openings and rotatably receiving a corresponding portion of said rotary agitator shaft, ground engaging wheels on the opposite ends of said agitator shaft and spaced laterally outwardly from said sidewalls, said hopper having a portion depressed substantially below said agitator shaft, a gear wheel fixed on said agitator shaft between one of the wheels and the adjacent sidewall of the hopper, a depending jackshaft having its upper end journaled in the journal part of the corresponding shaft bearing, gear means fixed on the upper end of said jackshaft and in mesh with said gear wheel, a transverse rotary material feeding shaft mounted in the lower part of the said depressed portion of the hopper, said feeding shaft having one end extended beyond the sidewall of the hopper adjacent said jackshaft, an operative connection between the lower end of said jackshaft and the feeding shaft, and bearing means on the sidewall of the hopper rotatably supporting the lower part of said jackshaft.

2. In a device of the character described, a hopper, a first horizontal shaft on an upper part of said hopper, said shaft extending beyond the opposite sides of the hopper, ground engaging wheels rotatably secured on the opposite ends of said shaft, a disk fastened to said shaft between one wheel and the adjacent side of the hopper, circumferentially spaced openings formed on said disk, a depending jackshaft rotatably mounted along said adjacent side of the hopper, radial lugs on the upper part of said jackshaft meshing with the said openings on the disk, a second horizontal rotary shaft on the lower part of the hopper, said second shaft having an end thereof exposed at said adjacent side of the hopper, the lower end of said jackshaft and the exposed end of said second shaft having meshed bevel gears operatively connecting them.

SILAS EMMETT WARREN.